Nov. 30, 1926.

T. B. HALL

CHASE AMUSEMENT STRUCTURE

Filed Nov. 17, 1923  2 Sheets-Sheet 1

Inventor:
Thomas B. Hall.
By Attorney.

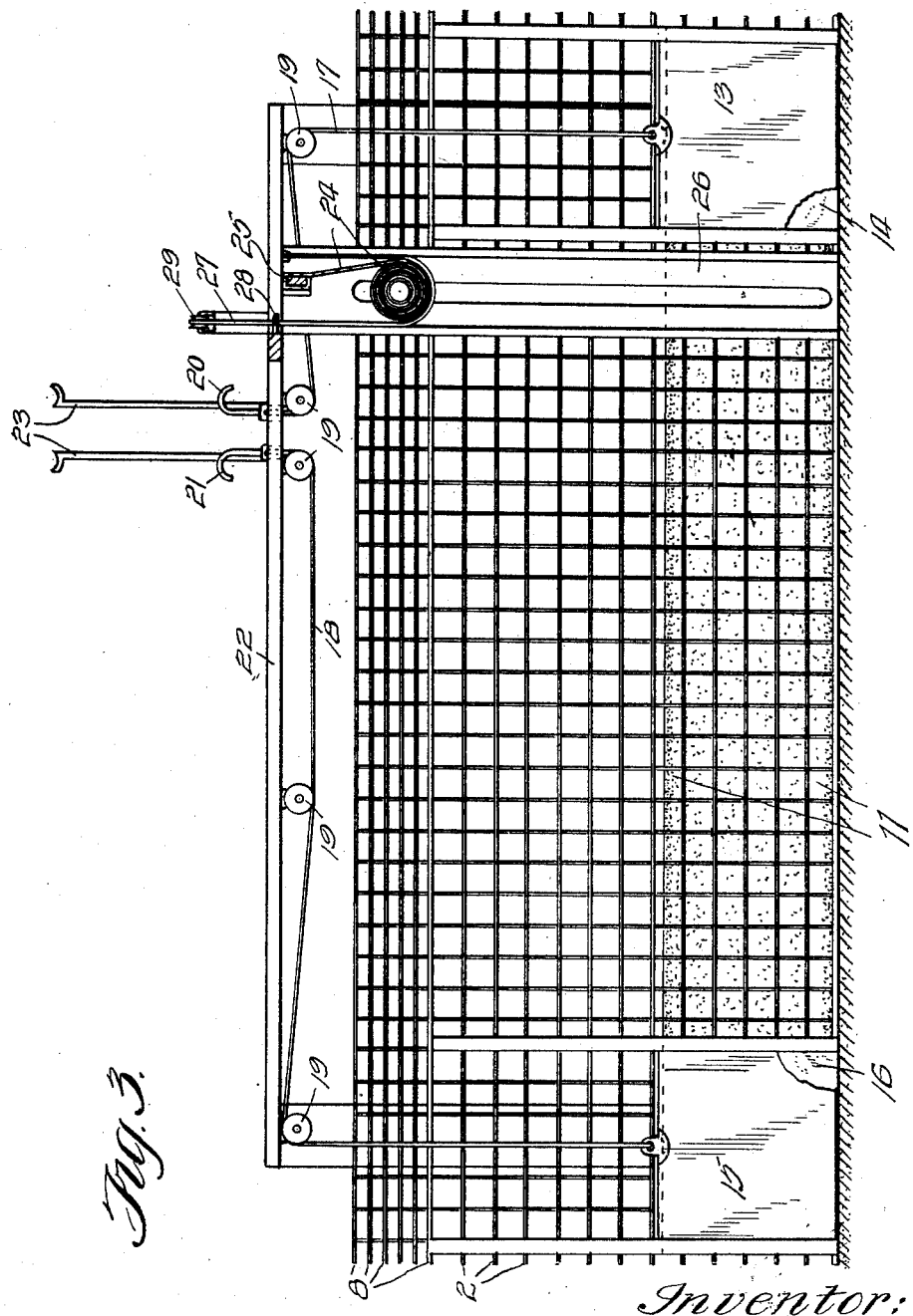

Patented Nov. 30, 1926.

1,608,935

UNITED STATES PATENT OFFICE.

THOMAS B. HALL, OF EAST ST. LOUIS, ILLINOIS, ASSIGNOR OF ONE-HALF TO WILLIAM O. FINKS, OF ST. LOUIS, MISSOURI.

CHASE AMUSEMENT STRUCTURE.

Application filed November 17, 1923. Serial No. 675,412.

This invention relates to an amusement structure, and, more particularly, to a portable structure to be erected upon a race track, or other suitable place in cities, towns and villages, for the staging of a controlled fox, wolf or coyote chase for the amusement of the public, which heretofore has only been possible to see in the wilds of the forests and upon the plains.

The objects of the invention are, first, to provide a portable chase course enclosure to be set up at a race course, or other suitable place; second, to provide a chase course enclosure which will confine the wild beasts, as well as the dogs, riders and their animals, to the chase enclosure and to permit the spectators to clearly observe the chase staged within the course enclosure from an adjacent grand-stand; third, to provide safety devices to save the life of the fox, wolf or coyote if too hotly and dangerously pursued, thus preventing the killing thereof by the bellowing pursuing running dogs; and, fourth to provide means for blocking the chase course to retard and halt the running dogs, animals and their riders.

With the above and other objects in view, the invention consists in the novel features of construction, arrangement and combination of parts and their equivalents, hereinafter more fully described and finally pointed out in the claims hereto appended.

Referring to the accompanying drawings forming a part of this specification, wherein like characters of reference denote similar parts throughout the several views:

Fig. 3 is a side elevation of a section of the chase structure with the outer fence removed to clearly show the drop curtain for spanning the course and the drop closures for each end of the beasts safety den.

Figure 1:
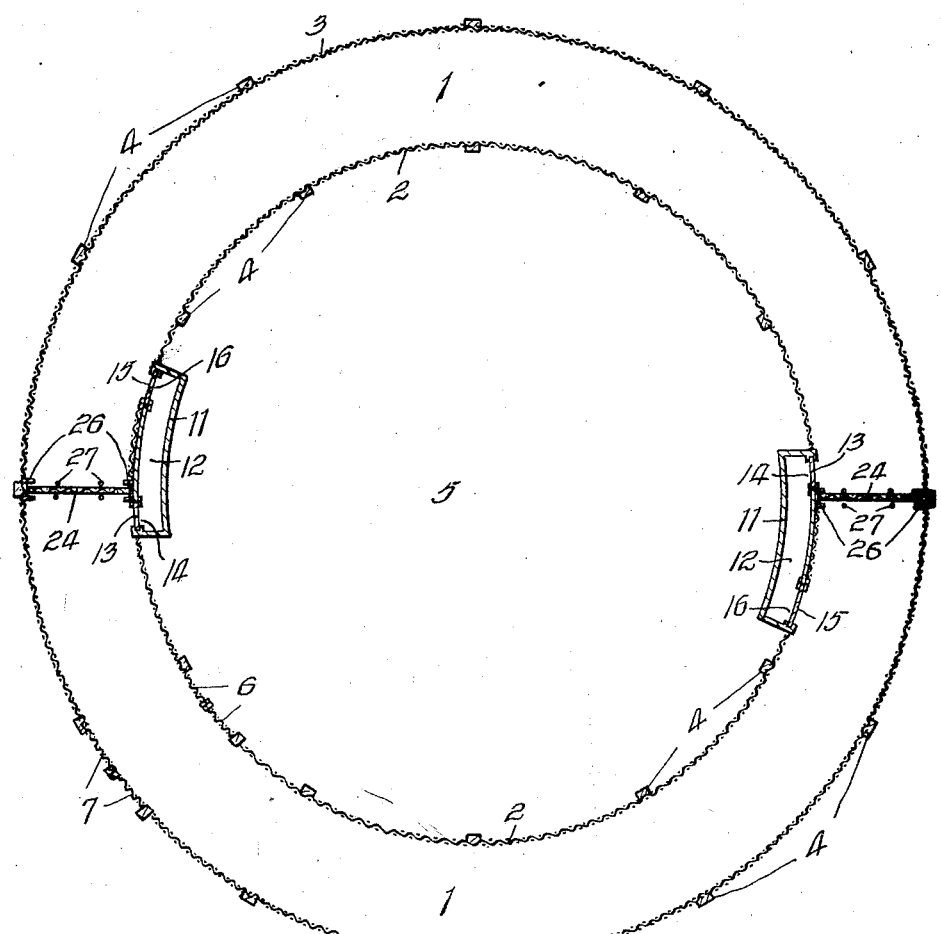
Fig. 1 is a horizontal sectional view of the fence structure and safety devices, taken on line 1—1 of Fig. 2, clearly showing the chase course.
Figure 2:
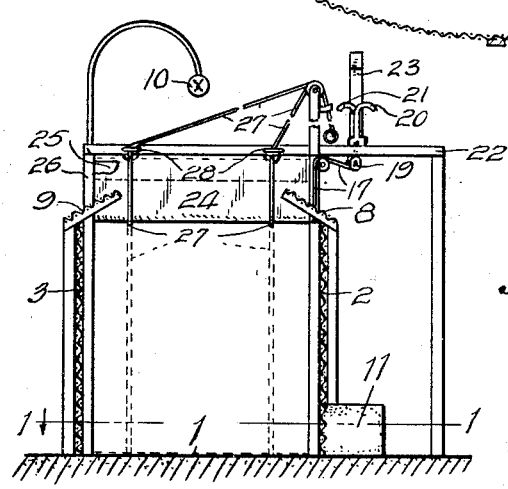
Fig. 2 is a vertical sectional view of the chase structure adjacent one of the drop curtains and one of the beast safety dens.

In carrying out the aim of my invention, I provide a suitably shaped chase course 1 by erecting a suitable inner fence 2 and a suitable outer fence 3 which are spaced a suitable distance apart to provide the chase course 1. The fences 2 and 3, which form the chase course enclosure, are preferably made from woven or other suitable wire attached to suitable supporting post 4. These fences are made from openwork material in order that the chase may be clearly and easily observed through the fences from both the center or inner field 5 formed within the inner fence 2 and from a grand-stand adjacent the outside fence. The inner fence 2 is preferably provided at a convenient place with a suitable double gate structure 6 and the outer fence 3 is preferably provided with a similar double gate structure 7 opposite the inner gate structure 6 to permit both individuals and vehicles to enter the center or inner field 5. The fences 2 and 3 may be made up of sections so that they may be rolled up into suitable bundles for transportation from place to place and to permit the fences 2 and 3 to be easily assembled and disassembled. While I have shown the chase course 1 as a circular track, it is evident that the course may be oval or other suitable shape, in plan view, and that the chase course may be of any desired distance, such for instance as one-half mile, one mile, and the like.

8 represents a suitably inclined fence guard which is suitably attached to the upper end of the inner fence 2, and 9 designates a similar inclined fence guard which is suitably attached to the upper end of the outer fence 3 to prevent the beast and running dogs from climbing and jumping the fences. As is evident, suitable illuminating means designated 10, are disposed above or adjacent the chase course 1 for illuminating the course at night.

11 indicates a suitable elongated hollow den structure to provide a side course 12 for the beasts when too hotly and dangerously pursued by the running dogs. The den structures 11 are positioned at intervals around the course and lie opposite the inner fence 2 within the inner field 5. The den structures may be made of any desired shape and size and from any suitable material. These dens may be either so constructed to permit the beast to be concealed from view of both viewing public when directed thereinto for safety, or observed by the dogs and public, if desired. The inner fence 2 is provided with a suitable closure 13 at the entrance opening 14 to each den 11 and with a suitable closure 15 at the exit opening 16 of each den 11. The closures 13 and 15 of each den is preferably of the drop type and the raising thereof is controlled by means of suitable cables 17 and 18, respectively, running over suitable pulley rollers 19. One end of each of the cables 17 and 18 are fixed to their respective den opening closure and the opposite ends thereof are fixed to suitable lifting handles 20 and 21, respectively. A suitable elevated platform 22 is disposed above each den 11 upon which suitable supports 23 are fixed to which the lifting handles 20 and 21 may be connected whenever the closures 17 and 18 are raised. When the closures are lowered by gravity, for closing the den openings, the handles are stopped from extreme downward movement by means of the platform 22.

The platform 22 is elevated so as to support the operator of the den closures, the master of the chase and others connected with the chase so that the chase can be easily and quickly controlled to suit the wishes of the master of the chase. The dens 11 are also each provided with a suitable closure 23 opening into the inner field 5 so that the beasts may be deposited in the dens from within the inner field, if desired.

24 indicates a suitable drop curtain or closure which spans the chase course or running track 1. The closure 24 is preferably fixed to and supported at its upper end by means of a suitable cross piece 25 carried by the side guide posts 26, which are disposed in pairs adjacent each fence to provide a channel for the sides of the curtain to enter, thus preventing displacement of the curtain at its sides should pressure be brought to bear thereagainst by the running dogs when in its dropped position, thereby providing effectual means to prevent stopping the running dogs whenever it is so desired, such as at any time the beast is diverted through the dens 11 to permit the beast to gain upon the dogs when too hotly or dangerously pursued. The drop curtain is controlled in its raising movement by means of suitable cords 27 which pass through eyelets 28 and over a pulley 29 fixed to the upper end of one of the guide posts 26. The upper free ends of the cords are disposed in close proximity of the lifting handles 20 and 21 so as to be within easy reach of the operator thereof.

From the foregoing description, it is evident that I provide an amusement structure which will permit the confinement and absolute control from a safety standpoint of the beast or beasts being pursued by running dogs, in that the beasts may be diverted from the main chase course 1 into a protected side course 12 when too hotly and dangerously pursued and that the running dogs, horses and their riders can be halted or retarded by means of the drop curtains until the beast has been given sufficient time within which to pass completely through the den and again enter the chase course 1 on the opposite side of the drop curtain from the pursuers. When it is desired to stop the chase, the beasts are retained within the side dens and after the closures thereto have been closed, the drop curtain can be raised so that the main closure will be open. In the course of a chase, it is evident that the drop curtain may be dropped and raised as many times as desired and that through these safety devices, the chase may be made as exciting as desired as both the beast or beasts and the dogs and animals are under the complete control of the master of the chase in view of the fact that a plurality of drop curtains and dens may be arranged at various intervals around the course.

By means of my portable chase structure, it is evident that a complete staging, setting and reproduction of the old time American and English fox chase, by blooded and speedy running hounds may be accomplished and this may be carried out in fair ground tracks, ball parks and other places that afford a space large enough, thus bringing the sport of the woods and field to the city population who have never before witnessed this exciting entertainment and sport, thus the real flight for life of the cunning red fox, or other beast, pursued by bellowing running dogs and mounted huntsmen, within a closure, will prove a very unique and exciting entertainment with every possible safeguard to the life of the pursued.

The many advantages of the herein described invention will readily suggest themselves to those skilled in the art to which it appertains.

I do not wish to be understood as having limited myself to the details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications, as may fairly fall within the scope of the appended claims when fairly construed.

What I claim is:

1. In an amusement structure for the staging of an animal chase, a pair of parallel endless openwork fences forming a chase course therebetween and forming a center parking and observation field within the inner fence for the pair, a plurality of non-openwork enclosures arranged within the center field forming short diverted courses running parallel with the chase course, said diverted courses having an inlet opening and an outlet opening communicating with the chase course, drop closures for said inlet openings, means for actuating said drop closures, drop closures for said outlet openings, means for actuating said drop closures, a manually actuated drop curtain disposed between the inlet opening and the outlet opening of each diverted course for diverting the pursued from the chase course into and through the diverted courses and temporarily halting the pursuers.

2. In an amusement structure for staging an animal chase, an openwork enclosure establishing a chase course and an inner field, a short auxiliary course protected from view running parallel with the chase course and occupying a small area of the inner field through which the pursued animals can be temporarily diverted from the chase course, said auxiliary course having an inlet opening at one end and an outlet opening at the opposite end and both communicating with said chase course, closures for said openings, means for raising said closures independently of each other, a drop curtain spanning the chase course between the inlet and outlet openings of the auxiliary course to direct the pursued into and through the auxiliary course and to halt the pursuers and means for raising said drop curtain independently of the closures for the openings of the auxiliary course.

3. In an amusement structure for the staging of a chase, an inner fence and an outer fence forming a main chase course therebetween, a plurality of diverted courses arranged at intervals to the inside of the inner fence and connected by means of a pair of end openings in the inner fence with the main course, vertically movable means for controlling said openings, an elevated stop closure spanning the main course intermediate the openings in the inner fence and means for controlling the dropping of said stop closure.

4. In a portable chase structure for wild beasts and running dogs and horses comprising an outer and an inner fence providing a chase course therebetween, a diverted course adjacent the inner fence having a beast inlet opening and a beast outlet opening communicating with the main chase course, means for controlling said openings and a drop curtain disposed between the inlet opening and outlet opening of each diverted course, said drop curtain spanning the main course for controlling the pursued and the pursuers in the chase.

In testimony whereof, I have hereunto signed my name to the specification.

THOMAS B. HALL.